United States Patent [19]
Lohman et al.

[11] Patent Number: 6,112,198
[45] Date of Patent: Aug. 29, 2000

[54] OPTIMIZATION OF DATA REPARTITIONING DURING PARALLEL QUERY OPTIMIZATION

[75] Inventors: Guy Maring Lohman; Mir Hamid Pirahesh; Eugene Jon Shekita; David E. Simmen, all of San Jose; Monica Sachiye Urata, Saratoga, all of Calif.

[73] Assignee: International Business Machines Corporation, Armonk, N.Y.

[21] Appl. No.: 09/106,473

[22] Filed: Jun. 29, 1998

Related U.S. Application Data

[60] Provisional application No. 60/051,259, Jun. 30, 1997.

[51] Int. Cl.[7] .................................................. G06F 17/30
[52] U.S. Cl. ...................................... 707/3; 707/3
[58] Field of Search ........................ 707/2, 3, 4

[56] References Cited

U.S. PATENT DOCUMENTS

| | | | |
|---|---|---|---|
| 5,745,746 | 4/1998 | Jhingran et al. | 707/2 |
| 5,828,409 | 3/1999 | Baru et al. | 707/2 |
| 5,960,427 | 9/1999 | Goel et al. | 707/4 |
| 5,987,453 | 11/1999 | Krishna et al. | 707/4 |
| 6,009,265 | 12/1999 | Huang et al. | 707/3 |

OTHER PUBLICATIONS

Baru, C.K., "DB2 Parallel Edition," *IBM Systems Journal*, vol. 34 No. 2, pp. 292–322, 1995.

Lohman, G., "Grammar–like Functional Rules for Representing Query Optimization Alternatives," In *Proceedings of the 1988 ACM SIGMOD Intn'l Conf. on Management of Data*, pp. 18–27, 1988.

Simmen, D., Fundamental Techniques for Order Optimization, In *Proceedings of the 1996 ACM SIGMOD Intn'l Conf. on Management of Data*, pp. 57–67, 1996.

*ISO and ANSI SQL3 Working Draft*—Feb. 5, 1993, Digital Equipment corporation, Maynard, Massachusetts.

*Primary Examiner*—Paul V. Kulik
*Attorney, Agent, or Firm*—Gray Cary Ware Freidenrich

[57] ABSTRACT

Query evaluation is optimized using parallel optimization techniques to make repartitioning more efficient. Efficiency is improved by recognizing the possible partitioning requirements for achieving parallelism for a query operation, and by recognizing when the partitioning property of data satisfies the partitioning requirements of a query operation. A data base management system in accordance with the invention uses parallel query processing techniques to optimize data repartitioning, or to avoid it altogether.

44 Claims, 12 Drawing Sheets

Example QEP for a Directed Join

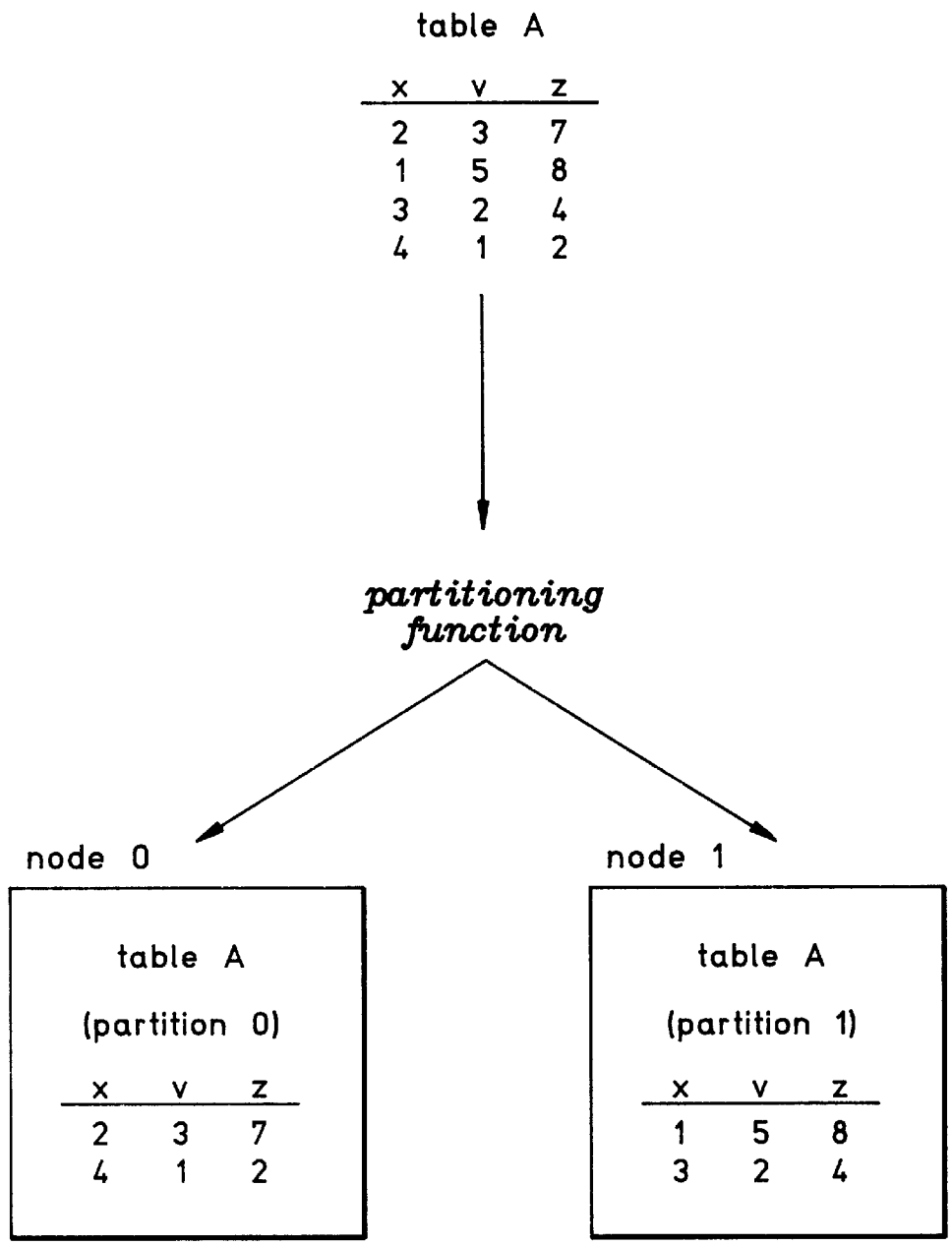
Figure 1: Example of Horizontal Partitioning

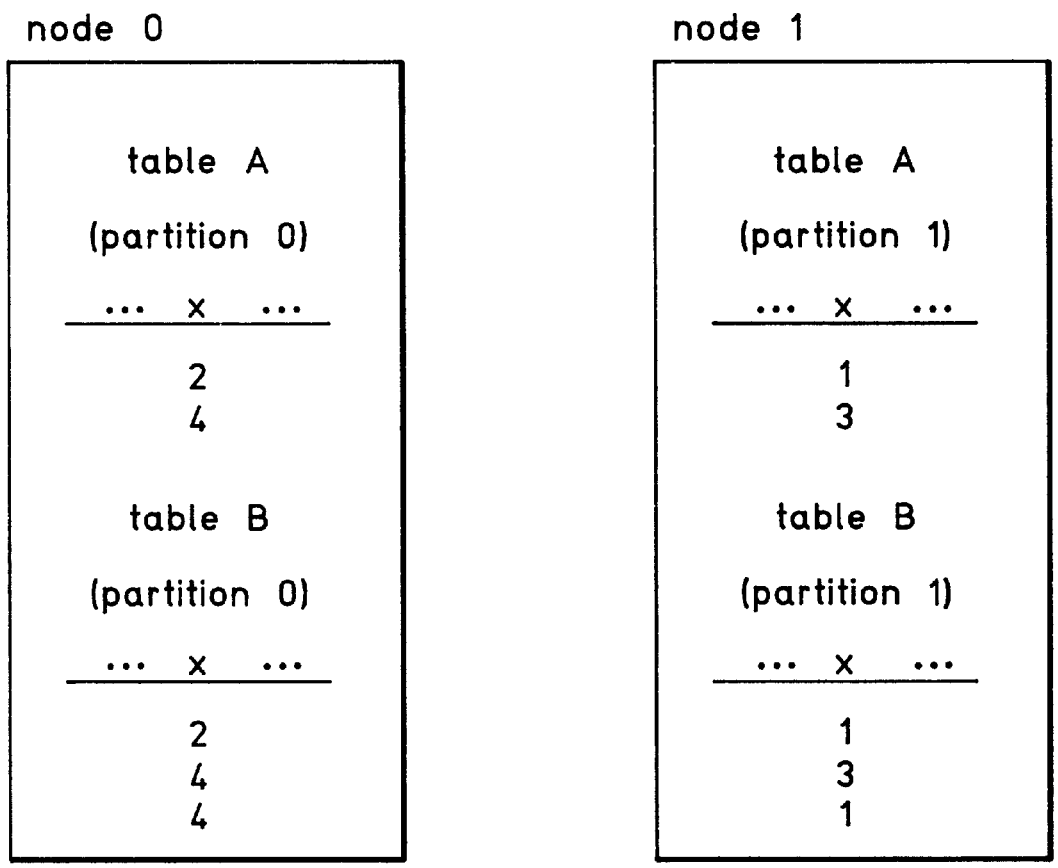
Figure 2: Example of Partitioned Join with no Data Movement

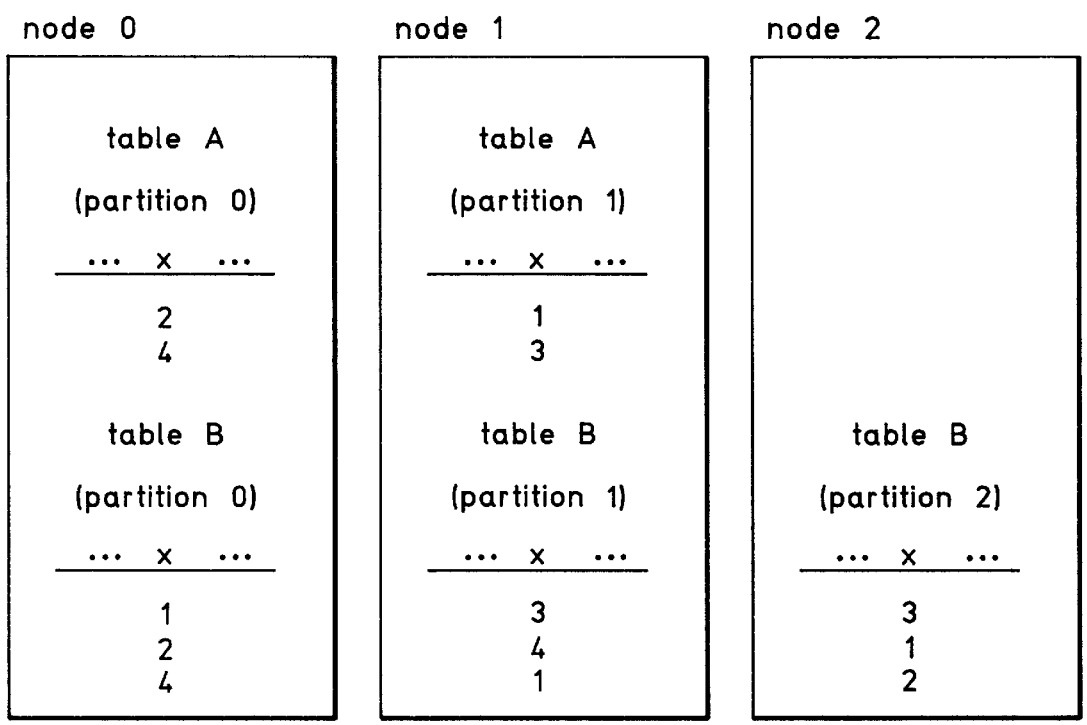
Figure 3: Example of Partitioned Join that Requires Data Movement

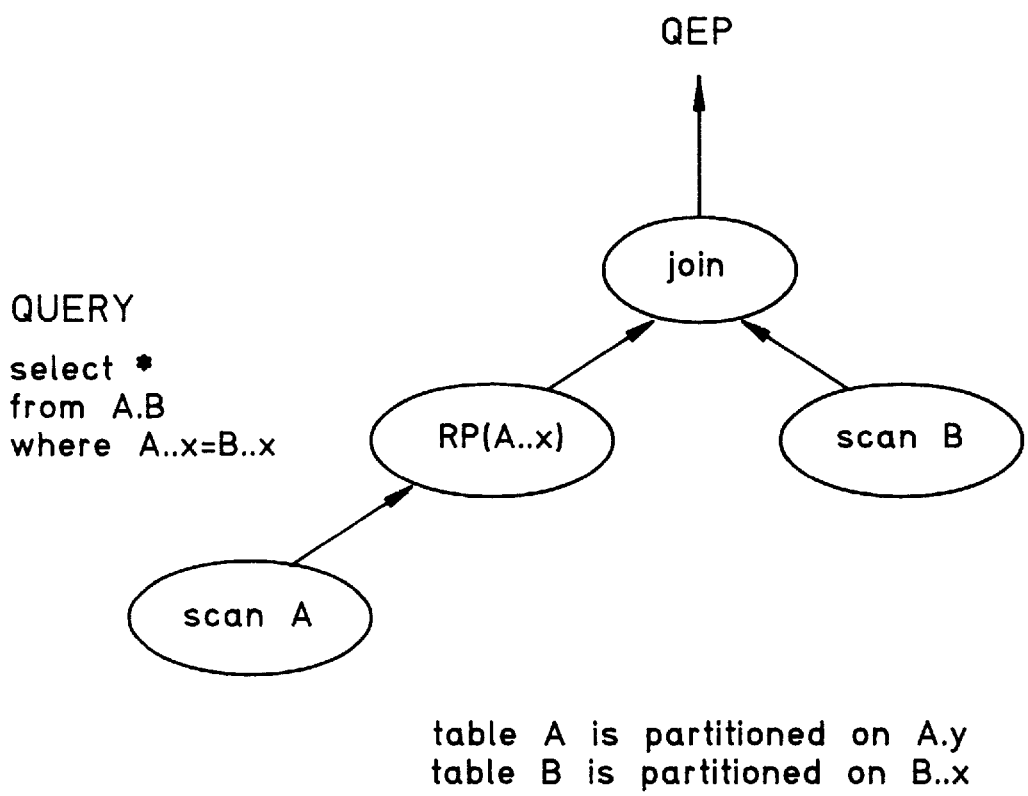
Figure 4: Example QEP for a Directed Join

Figure 5: Column Homogenization Process homogenize
　input:
　　　applied predicates PREDS,
　　　target tables TABLES,
　　　column to homogenize C
　output:
　　　result of homogenizing the column R 1)　set result R to NULL
2)　compute EQ the equivalence class for C using PREDS
3)　for (each column $c_i$ of EQ while R is NULL)
4)　　if ($c_i$ belongs to a table in TABLES) then
5)　　　set result R to $c_i$
6)　　endif
7)　endfor
8)　return R

Figure 5

Figure 6: Mapping a Target Partitioning to Source build-dir-req input:
    predicates PREDS,
    source tables TABLES,
    target partitioning requirement TP output:
    source partitioning requirement SP 1) set $b\_i$ to some non NULL value
2) for (each partitioning column $c\_i$ of TP while $b\_i$ is not~NULL)
3)     $b\_i=\sim\{\bf\ homogenize\sim(\sim PREDS,\sim TABLES,\sim c\_i)$
4)     set the corresponding partitioning column of SP to $b\_i$
5) endfor
6) if ($b\_i$ is~not~NULL) then
7)     set the nodegroup identifier of SP to the nodegroup identifier of TP
8)     set the function identifier of SP to the function identifier of TP
9)     return SP
10) else
11)     return NULL
12) endif
13) return SP

Figure 6

Figure 7: Using the build-dir-req Process to Build a Join Requirement build-dir-req input:
    join predicates PREDS,
    target QEP TQEP,
    source tables TABLES output:
    source partitioning requirement SP 1) build target part req, TP, by casting part prop of TQEP
2) SP = build-dir-req (PREDS, TABLES, TP)
3) if (SP is NULL) then
4)     set the nodegroup i.d. of SP to the nodegroup i.d. of TP
5)     set the function i.d. of SP to "broadcast"
6) endif
7) return SP

Figure 7

Figure 8: Using build-dir-req Process to Build a Local or Directed Subquery Requirement build-dir-req input:
  correlation predicates CPREDS,
  subquery predicate SPRED,
  target QEP (applying subquery predicate) TQEP,
  tables of subquery producer TABLES, output:
  source partitioning requirement SP 1)  build target partitioning requirement, TP, by casting partition property of TQEP
2)  set PREDS to CPREDS
3)  if (SPRED is of form: COL1 OP COL2 where OP
4)      is either = ANY, <> ALL, NOT IN, or IN) then
5)      build predicate COL1 = COL2 and add it to PREDS
6)  endif
7)  SP = build-dir-req (PREDS, TABLES, TP)
8)  if (SP is NULL) then
9)      set the nodegroup i.d. of SP to the nodegroup i.d. of TP
10)     set the function i.d. of SP to "broadcast"
11) endif
12) return SP

Figure 8

Figure 9: Improved build-dir-req Process

```
build-dir-req
input:
    applied predicates PREDS,
    source tables TABLES,
    target partitioning requirement TP
output:
    source partitioning requirement SP
1)  set b_i to some non NULL value
2)  set all-correlations to true
3)  using PREDS, determine CORR, the set of correlated columns referenced by TABLES
4)  for (each partitioning column c_i of TP while b_i is not~NULL)
5)      if (c_i is bound to a constant b_i) then
6)          set the corresponding partitioning column of SP to b_i
7)      else
8)          b_i = homogenize (PREDS, TABLES, c_i)
9)          if (b_i is not NULL) then
10)             set the corresponding partitioning column of SP to b_i
11)             set all-correlations to false
12)         else (if (c_i is in the set CORR) then
13)             set b_i to c_i
14)             set the corresponding partitioning column of SP to b_i
15)         endif
16)     endif
17) endfor
18) if (b_i~is~not~NULL and all-correlations is FALSE) then
19)     set the nodegroup identifier of SP to the nodegroup identifier of TP
20)     set the function identifier of SP to the function identifier of TP
21)     return SP
22) else
23)     return NULL
24) endif
```

Figure 9

Figure 10: Improved build-dir-req Process listener-rp-pred input:
    tuple to send to caller T
    caller's node number N,
    target partitioning requirement TP output:
    true if the tuple should be sent to the caller and false otherwise R 1)   set RN to result of applying the partitioning function of TP to
      columns of T
2)   if (RN is the same as N) then
3)       set R to TRUE
4)   else
5)       set R to FALSE
6)   endif
7)   return R

Figure 10

Figure 11: local-agg-test Process local-agg-test input:
applied predicates PREDS,
grouping columns GC
input QEP for aggregation TQEP output:
result of the test R 1) set result R to FALSE
2) set PP to the partitioning property of TQEP
3) if (PP is located on a single node nodegroup)
4)    set result R to TRUE
5) else
6)    compute the equivalence classes EQ using PREDS
7)    set result R to TRUE
8)    for (each column $k_i$ of the partitioning key of PP while R is TRUE)
9)       set R to FALSE
10)       for (each column $c_i$ of GC while R is FALSE)
11)          if ($c_i$ and $k_i$ are in the same equivalence class in EQ)
12)             set result R to TRUE
13)          endif
14)       endfor
15)    endfor
16) endif
17) return R

Figure 11

Figure 12: Improved local-agg-test Process local-agg-test
input:
    applied predicates PREDS,
    grouping columns GC
    input QEP for aggregation TQEP
output:
    result of the test R 1) set result R to FALSE
2) set PP to the partitioning property of TQEP
3) if (PP is located on a single node nodegroup)
4)     set result R to TRUE
5) else
6)     compute the equivalence classes EQ using PREDS
7)     set result R to TRUE
8)     for (each column $k_i$ of the partitioning key of PP while R is TRUE)
9)         if ($k_i$ is not bound to a constant or correlation value)
10)             set R to FALSE
11)             for (each column $c_i$ of GC while R is FALSE)
12)                 if ($c_i$ and $k_i$ are in the same equivalence class EQ)
13)                     set result R to TRUE
14)                 endif
15)             endfor
16)         endif
17)     endfor
18) endif
19) return R

Figure 12

OPTIMIZATION OF DATA REPARTITIONING DURING PARALLEL QUERY OPTIMIZATION

This Application claims the benefit of U.S. Provisional Application Ser. No. 60/051,259, filed on Jun. 30, 1997.

BACKGROUND OF THE INVENTION

1. Field of the Invention

This invention relates generally to database management systems and, more particularly, to efficient evaluation of queries processed in relational database management systems.

2. Description of the Related Art

A data base management system (DBMS) often uses parallel query execution to deal with the performance demands imposed by applications executing complex queries against massive databases. Such parallelism is frequently achieved by partitioning a database among processors. The queries are broken into subtasks based upon the partitioning of the database, so that different subtasks are assigned to different data partitions. The subtasks are executed by the processor managing the partition and the results of these subtasks are merged for delivery to an end user. Optimization choices regarding how queries are broken into subtasks are driven by how the data is partitioned. That is, the partitioning property of the data determines how the queries are divided into subtasks. Often data has to be repartitioned dynamically to satisfy the partitioning requirements of a given query operation. Repartitioning is an expensive operation and should be optimized or avoided altogether.

From the discussion above, it should be apparent that there is a need for a database management system that evaluates complex query statements with reduced requirements for repartitioning of data and more efficient partitioning of the data. The present invention fulfills this need.

SUMMARY OF THE INVENTION

The present invention optimizes query evaluation by using parallel optimization techniques to optimize repartitioning by recognizing: (1) the possible partitioning requirements for achieving parallelism for a query operation, and (2) when the partitioning property of the data satisfies the partitioning requirements of a query operation. A data base management system in accordance with the invention uses parallel query processing techniques to optimize data repartitioning, or to avoid it altogether. These techniques apply to join operations, aggregation operations, and operations that apply subquery predicates. Unlike conventional query processing techniques, these techniques exploit the effect of data properties that arise from predicate application on the partitioning property of the data.

Other features and advantages of the present invention should be apparent from the following description of the preferred embodiment, which illustrates, by way of example, the principles of the invention.

BRIEF DESCRIPTION OF THE DRAWINGS

FIG. 1 is a representation of horizontal partitioning of data tables in a data base management system constructed in accordance with the present invention.

FIG. 2 is a representation of a partitioned join operation in a data base management system with no data movement required.

FIG. 3 is a representation of a data base management system partitioned join operation that requires data movement.

FIG. 4 is a representation of a query execution plan (QEP) for a directed join operation in a data base management system.

FIG. 5 is a representation of a column homogenization process in a data base management system.

FIG. 6 is a representation of a build-dir-req process using "naive" processing, for generating a requirement for a source stream from a target partitioning requirement.

FIG. 7 is a representation of the build-dir-req process for building a partitioning requirement for the source stream of a join operation.

FIG. 8 is a representation of a build-subq-req process that is used in building a requirement for a local or directed subquery predicate application.

FIG. 9 is a representation of a build-dir-req process in accordance with the invention, which considers the effect of predicates binding partitioning key columns and considers correlation.

FIG. 10 is a representation of an improved version of the build-dir-req process in accordance with the invention, referred to as a listener-rp-pred process.

FIG. 11 is a representation of a local-agg-test process for determining when aggregation can be completed locally.

FIG. 12 is a representation of an improved version of the local-agg-test process illustrated in FIG. 11, performed in accordance with the present invention.

DESCRIPTION OF THE PREFERRED EMBODIMENTS

The present invention is implemented in a relational data base management system (RDBMS) whose operations are represented in the drawing figures. It should be understood that like reference numerals in the drawings refer to like elements.

Parallelism

Parallelism is often used in conjunction with a computer hardware architecture called shared-nothing to speed up the execution of queries. In a shared-nothing architecture, a collection of processors (or nodes) execute queries in parallel. A given query is broken up into subtasks, and all the subtasks are executed in parallel by the processors. Nodes in a shared-nothing architecture are typically connected by a high-speed communication network. The network is used to coordinate subtasks across nodes and also to exchange data between nodes. Each node has its own memory and disk.

To permit parallel query execution, tables are horizontally partitioned across nodes. Access to a given partition is only through the node which manages that partition. The rows of a table are typically assigned to a node by applying some deterministic partitioning function to a subset of the columns. These columns are called the partitioning key of the table. A simple example illustrating how a table might be partitioned is shown in FIG. 1.

In FIG. 1, Table A has been partitioned on a column A.x. Thus, the partitioning key is said to be A.x. The partitioning function assigns the rows of Table A to node 0 or to node 1. In this example, rows with even values in A.x are assigned to node 0, while rows with odd values in A.x are assigned to node 1. Typically, the partitioning function is based on a simple hashing scheme.

Query Optimization in a Shared-Nothing RDBMS

The query optimizer in an RDBMS is responsible for translating an SQL query into an efficient query execution plan (QEP). The QEP dictates the methods and sequence used for accessing tables. These methods are used to join these tables, the placement of sorts, aggregation, predicate application, and so on. The QEP is interpreted by the database execution engine when the query is subsequently executed. There is added complexity in optimizing queries for a shared-nothing architecture. Among other things, the added complexity involves determining how to break the QEP into subtasks and then merge the results of subtasks for delivery to an end user.

In a shared-nothing architecture, the partitioning property is used during query optimization to keep track of how a table (or intermediate) result has been partitioned across nodes. The partitioning property describes two different aspects: (1) the nodes on which partitions of that table reside; and (2) the partitioning algorithm used to assign rows to nodes. Optimization choices about how queries are broken into subtasks are driven by the partitioning property. As an example, consider the query:

Query 1

```
select *
from A, B
where A.x = B.x
```

It should be noted that tables are referred to in queries by only their name, so that "A, B" is understood to refer to Table A and Table B. This convention will also be used occasionally in text.

If Tables A and B are partitioned over the same nodes, use the same partitioning algorithm, and are both partitioned on column x, then the join can be performed in parallel without any data movement. This is illustrated in FIG. 2. As shown, no data movement is required to execute the join because the rows of A and B that satisfy the join predicate A.x=B.x are assigned to the same nodes. Parallel execution in this example is achieved by having a coordinator process, replicate, and ship identical QEPs joining Table A and Table B to node 0 and node 1. Each node performs its join asynchronously and then returns rows back to the coordinator.

Partitioning Alternatives for Joins

The join in the previous example gives rise to a partitioning requirement. The join requires that Table A and Table B are partitioned over the same nodes, use the same partitioning function, and are partitioned on column x. That is, their partition property must be the same and they must be partitioned on the join column, x. If this was not the case, then it would have been necessary to dynamically repartition the tables to satisfy the partitioning requirement.

Repartitioning is illustrated using the same query as in the previous example. As before, assume Table A is partitioned on column x over nodes 0, 1 but now Table B is partitioned on some other column over nodes 0, 1, 2. This is shown in FIG. 3, which provides an example of a partitioned join operation that requires data movement.

In the situation represented in FIG. 3, one or both of the tables needs to be dynamically repartitioned prior to executing the join. One option is to dynamically repartition Table B using the join column x among nodes 0,1 and to join this derived result with Table A in parallel. This join method is commonly known as a directed join because it directs rows of B to A. Alternatively, the query optimizer can replicate the data from Table A to all nodes of Table B. This join method is known as a broadcast join. It should be understood that the term "broadcast" will denote the replication of data across a set of nodes. Finally, the optimizer could decide to repartition both tables over some completely different set of nodes, again using the join column x to distribute rows. This parallel join method is typically called a repartition join. During optimization, a QEP would be generated for each of the different join methods mentioned above, assigned a cost based on an estimation of the QEP's execution time, and the least costly alternative would be chosen. The term "partitioned join" will be understood to refer to local, directed, or repartitioned join strategies. Unlike a broadcast join, these strategies serve to join partitions of both tables.

Partitioning Alternatives for Applying Subquery Predicates

Parallel execution strategies for subquery predicate application are analogous to the parallel join strategies described above. As noted above, implementing parallelism (that is, the parallelization decisions) for a join are hinged on how the two input tables are partitioned with respect to the join predicate(s). Likewise, the parallelization decisions for applying a subquery predicate hinge on how the table applying the subquery predicate and the table producing the subquery result are partitioned with respect to the subquery predicate(s). As an example, consider the query below:

Query 2

```
select *
from A
from A.x < > ALL (select B.x
    from B
    where B.y > 0)
```

As is in the case for a local join, if Tables A and B are partitioned over the same nodes, use the same partitioning algorithm, and are both partitioned on column x, then the subquery predicate can be applied in parallel without any data movement.

There are also directed, broadcast, and repartitioned versions of plans for parallel subquery predicate application. For example, if the subquery table were partitioned on something other than x, it could be directed by x values to the nodes of A. Similarly, the subquery result could be broadcast to the nodes of A. It is also possible to defer the application of the subquery predicate until after the table that applies the predicate has been repartitioned. Consequently, one could direct or broadcast the table applying the subquery to where the subquery result resides. Moreover, the optimizer could decide to repartition both tables over some completely different set of nodes prior to applying the subquery predicate. This strategy is congruous to a repartitioned join. The term "partitioned subquery predicate application" should be understood to refer to local, directed, or repartitioned subquery predicate application strategies.

Partitioning Alternatives for Aggregation

The parallel execution strategy for aggregation is typically carried out in two steps. Consider the following example Query 3.

---
Query 3 select count(*)
from A
group by y
---

Suppose that Table A is partitioned over multiple nodes using the partitioning key x. In the first step of query evaluation, aggregation is done on static partitions of A. Since A is not partitioned on the grouping column y, it is possible that rows in the same group reside on different nodes. Thus, the result of the first step of aggregation results in a partial count for each group on each node. In the final step, data is dynamically redistributed so that all rows with the same y value are on the same node. Partial counts are then added together to form the final result.

The final aggregation step is unnecessary if data is initially partitioned such that all rows of the same group are on one node. As described in the current literature, this is the case when the partitioning key columns are a subset of the grouping columns. It should be noted that the partitioning algorithm is deterministic. Two different rows will be assigned to the same node if they have the same input column values. Columns in the same group have the same values for the grouping columns. Thus, if the preceding example is changed so that Table A is initially partitioned on y, the final aggregation step is unnecessary.

Duplicate elimination (distinct) can be thought of as a special case of aggregation (with no aggregating functions); therefore, all of the parallelization decisions just described for aggregation apply to duplicate elimination as well.

The Effect of Other Properties on Partition Analysis

The term "partition analysis" will be used to designate the collection of processing involved in two tasks: (1) determining the partitioning requirements for a given operation; and (2) when a partitioning property satisfies a given partitioning requirement. In the preceding sections, basic partition analysis for simple queries involving joins, subquery predicate evaluation, and aggregation have been described. To perform this task efficiently, the optimizer has to deal with the effect of other properties to avoid unnecessary movement of data.

As an example of how other properties come into play, consider the following example Query 4:

---
Query 4 select *
from A, B
where A.x = 3 and A.y = B.y
---

Suppose that Table A is partitioned over multiple nodes using the composite partitioning key of columns A.x and A.y. Suppose that Table B is partitioned over the same nodes using column B.y.

As described above, the naive processing for determining the partitioning strategies for a join would fail to determine that a join strategy which directs tuples of B to nodes of A is a possibility. That is, they would fail to recognize that there is a way to repartition B on the nodes of A so that a local join could then take place between A and the result of repartitioning B. These naive processes require that there is a join predicate equating each of the corresponding columns of the partitioning key of A to some column of B. This criteria is not satisfied for A.x. A directed join strategy can be constructed, however, by taking advantage of the fact that A.x is bound to a constant value. This information can be used to repartition B using the values "3" and B.y and then do a local join with A and the repartition result.

Understanding of the rationale is best given via proof by contradiction. Suppose that B has been repartitioned using the values 3 and B.y. Suppose that the join of A and the repartitioned version of B cannot be done locally. Let k be a value of B.y from a row on node n_i which joins with some A row. Since the join cannot be done locally, there must exist some different node, n_j, where A.y=k. Observe that A.x=3 must be satisfied on all nodes. Thus, both rows from A have the same values for the partitioning columns, 3 and k. Since the partitioning algorithm is deterministic, n_i and n_j must be the same node.

Failure to recognize that the join can be done locally would result in at least one of the tables being repartitioned or broadcast needlessly. Such a plan might be orders of magnitude worse in performance. The present invention recognizes this.

Partitioning key columns can also be bound in a context-dependent way via correlated columns, as illustrated in the following example of Query 5:

---
Query 5 select *
from B
where B.z > ANY (select count(*)
    from A
    where x = B.x;
    group by y
---

Suppose that A is still partitioned as in the previous example. It was mentioned earlier that parallel aggregation requires two phases, unless the input to the initial aggregation phase is partitioned such that the partitioning key columns are a subset of the grouping columns. This condition does not hold here, because Table A is partitioned using columns A.x and A.y; nevertheless, the final aggregation step is not necessary, because A.x is bound to the correlation value B.x. The argument is similar to that provided for the previous example. The general effects of column equivalence and correlation must also be considered in partition analysis. This is described further below.

The term "partition analysis" has been defined to refer to algorithms for determining the partitioning requirements for QEP operations and for determining when a partitioning property satisfies these requirements. In particular, partition analysis has been described for join, subquery predicate evaluation, and aggregation queries. The effect of other properties on partition analysis also has been illustrated. Specifically, the way in which application of predicates effects partition analysis has been described. Failure to consider these effects can result in the unnecessary movement of data and a QEP, which may perform orders of magnitude worse than one that does consider these effects.

QEPs, Tuple Streams, and Properties

A query compiler for a relational data base management system (RDBMS) in accordance with the invention translates a high-level query into a query execution plan (QEP). This QEP is then interpreted by a database engine at run-time. Conceptually, a QEP can be viewed as a dataflow graph of operators, where each node in the graph corresponds to a relational operation like join or a lower-level operation like sort. Each operator consumes one or more input sets of tuples (i.e., relations), and produces an output set of tuples (another relation). The input and output tuple sets will be referred to as tuple streams.

Each tuple stream includes a defining set of characteristics or properties \cite{Lohman88. Examples of properties include the set of tables accessed and joined to form the tuples in the stream, the set of columns that make up each tuple in the stream, the set of predicates that have been applied to the tuples in the stream, the partitioning of the tuples in the stream, and so forth.

Each operator in a QEP determines the properties of its output stream. The properties of an operator's output stream are a function of its input stream(s) and the operation being applied by the operator. For example, a sort operation (SORT operator) passes on all the properties of its input stream unchanged except for the order property. The repartition operation (RP operator) changes the partitioning property of the tuple stream. A query compiler will typically build a QEP bottom-up, operator-by-operator computing properties as it goes. Note that, depending on the implementation, some properties may be stored in QEP operators, while others may be recomputed when needed to save space.

As a QEP is built, partitioning requirements for new operators must be satisfied, e.g., the input streams of the join might need to be repartitioned or replicated so that they are compatible for a parallel join. The join operation first determines a set of target partitionings, and then for each, attempts to build a partitioning requirement for the join operands. If a join operand does not satisfy a partitioning requirement, an RP operator is added to the QEP for that operand. FIG. 4 shows an example of a directed join operation.

The outer table, Table A, is not initially partitioned on the join column, x. The inner table, Table B, is partitioned on the join column so the optimizer designates the inner table partitioning as the target partitioning. A partitioning requirement for the outer table is then derived from the target partitioning using the join predicates. The requirement consists of the nodes of the inner table and the join column. A request is made for an outer table QEP that satisfies this partitioning requirement. Because none exists, an RP operator is added to an existing QEP. Partitioning requirements and the RP operator will be described in more detail below.

With respect to join operations, other operators determine partitioning requirements based upon analysis of the query, and attempts to build a QEP which satisfies these requirements. For example, the aggregation operation (GROUP BY operator) generates a partitioning requirement for local aggregation and tests the partitioning property of the input stream to determine if a final aggregation step is necessary.

Relevant Properties Other than the Partitioning Property

Partition analysis is effected by more than the partitioning property. The relevant properties are briefly described below. The following description provides a general idea or references as to how relevant properties may be acquired or changed by different operators may be accomplished. The details of such operations should be apparent to those skilled in the art, in view of this disclosure. The description will focus on how each respective property is used in partition analysis.

One of the relevant properties is the tables property, which keeps track of the relations that have been accessed and joined to form the tuples in the stream. Different accesses to the same table are recorded as separate entries in the tables property. Another relevant property is the columns property. The columns of a tuple stream can include both columns from base relations and those derived from expressions. The columns property is used to keep track of a tuple stream's columns. Another property is the predicates property. During compilation, the predicates in a SQL query are typically broken down into conjunctive normal form. This allows each conjunct to be applied as an independent predicate. When a predicate (actually conjunct) is applied to an input tuple stream, each tuple in the resulting output stream has the property that it satisfies the predicate. The predicates property is used to keep track of all the predicates that have been applied to a tuple stream.

Another relevant property relates to column equivalence. For partition analysis, we are particularly interested in predicates that equate columns, like EMPNO=DEPTNO. These give rise to equivalence classes, which are sets of columns made equivalent by the application of equality predicates. Two columns can be made equivalent by a single predicate equating the two columns or by transitivity among two or more equality predicates. For a given equivalence class, one column is arbitrarily chosen as the equivalence class head. In the degenerate case, each column is equivalent to itself and thus in some equivalence class.

For partition analysis, it is assumed that, given a set of applied predicates, there is some way to determine: (1) whether some column $C\_i$ is in the same equivalence class as another column $C\_j$; and (2) the equivalence class head for an arbitrary column C. It is important to point out that correlated columns are included in equivalence classes. For example, if the conjunct X=A is applied, where A is a correlated reference to another query block, then X and A are assumed to be in the same equivalence class.

Also considered are predicates equating columns of tables in an outer join operation in the same equivalence class for partition analysis. For example, if A.X=B.X is a predicate in an ON clause of an outer join operation between tables A and B, A.X and B.X are considered to be in the same equivalence class.

Bound Columns

Bound columns also will be considered in the following description. As illustrated above, partition analysis also needs to determine when a column has a constant value. A column C is bound in a tuple stream if C has the same value for every tuple in the stream. A column C can become bound in a variety of ways:

(a) C can be derived from a constant expression;
(b) there exists a predicate of the form C=10;
(c) a column in the equivalence class of C has become bound; or
(d) columns which functionally determine C have become bound A column C can also become bound in a context-dependent way. For example, suppose we have $C\_i=C\_j$ and $C\_j$ is a correlated column. Then $C\_i$ is bound in the context where $C\_j$ is correlated. For partition analysis, it is assumed that, given a set of applied predicates, there is some way to determine if a column C in a tuple stream is bound and whether this property is context-dependent or not.

Correlated Columns

In contrast to the columns property, which essentially keeps track of columns which are flowed from base tables, the correlated columns property keeps track of column values which are supplied by some other tuple stream.

As an example, consider a join between two tables, Table T and Table R, using the join predicate T.C=R.C. Typically, an optimizer pushes down a join predicate so that it is applied when the inner table is accessed. Suppose that R is the inner table of a join and that the predicate has been pushed down to the access of R. Suppose further that R is accessed with an index scan ho as represented by an ISCAN operator. The ISCAN operator would apply T.C=R.C and include T.C in the correlated columns property to indicate that this value must be supplied by some other stream. When the tuple streams for R and T are finally joined, the join operator will remove T.C from the correlated columns property to indicate that the value is no longer needed as a correlation.

In addition to correlated column references which occur due to the optimizer's decision to push down a join predicate, correlated column references can occur because a subquery references a column as an outer-reference. For partition analysis, it is assumed that, given a set of applied predicates, and a set of tables to which the predicates will be applied, there is some way to determine the correlated column references. This is essentially computed by subtracting the columns that can be supplied by the tables from those referenced in the predicates.

The Partitioning Property

The partitioning property of a tuple stream represents how the stream's tuples are distributed among nodes of the system. The partitioning property identifies: (1) the set of nodes that may contain tuples of the stream; and (2) the partitioning algorithm used for assigning tuples to nodes.

A "nodegroup" is defined as a subset of the parallel system's nodes over which a tuple steam can be partitioned. Different streams may be distributed over the same nodegroup. Each nodegroup is assigned a unique identifier and this identifier is what is recorded in the partitioning property. Streams distributed over the same nodegroup, i.e. tables having the same nodegroup identifier, are said to be collocated.

A partitioning algorithm is needed only for multi-node nodegroups. The partitioning algorithm is typically implemented with a deterministic function, like a hash function, applied to some subset of the columns of the tuple stream. These columns are called the partitioning key. Since the function is deterministic, tuples with the same values for the partitioning key are assigned to the same node. The partitioning key is represented by listing the columns to which the partitioning function is applied. For example, $(C\_1, C\_2, C\_3)$ is a representation of a partitioning key. It is assumed that the order of the columns in the partitioning key is relevant. Therefore, saying that the tuple stream is partitioned on $(C\_1, C\_2)$ is different than saying that it is partitioned on $(C\_2, C\_1)$.

Specifically, the partitioning property is represented by three elements:

(1) the nodegroup identifier;

(2) the partitioning function identifier; and (3) the partitioning key.

The latter two partitioning property elements are recorded only if the nodegroup contains multiple nodes. In certain cases, like in the case of a broadcast join, we may need to replicate tuples over all nodes in the nodegroup. The resulting partitioning property is represented with the nodegroup identifier and a special partitioning function which indicates that tuples are replicated. Thus, in this case, only the nodegroup identifier and partitioning function identifier are needed.

Finally, two partitioning properties are said to be equivalent if they are collocated, use the same partitioning function, have the same number of partitioning columns in the partitioning key, and corresponding partitioning key columns are in the same equivalence class. Single node nodegroups are equivalent if they are collocated. Inherent in this definition is the assumption that the partitioning function behaves the same regardless of the data types of its input. That is, if the predicate $c\_i=c\_j$ evaluates to true, then it is assumed that the partitioning function produces the same value regardless of whether the value of $c\_i$ or $c\_j$ is used. This simplifies the exposition without loss of generality.

Partitioning Requirements

A partitioning requirement indicates a desired partitioning property for a QEP operation; consequently, a partitioning requirement has all of the same information included in a partitioning property. In general, it is assumed that a partitioning property and partitioning requirement are interchangeable and that one can be derived from the other via a simple cast function (a function that simply changes the data type). It is said that a partitioning property satisfies a partitioning requirement if the two are equivalent after the partitioning requirement has been cast to a property. If no QEP satisfying a partitioning requirement exists, an RP operator is added to one or more existing QEP's. The partitioning requirement is passed as an argument to the RP operator.

The RP Operator

The RP operator is the only operator which can change the partitioning property of the data. One of its arguments is a partitioning requirement which must be satisfied. It achieves this by applying the partitioning algorithm specified by the partitioning requirement to each tuple of the input stream and sending the tuple to the node (or nodes in the case of a broadcast algorithm) which results. The nodes of the input stream to which the RP operator applies the partitioning algorithm are called the producer nodes, and the nodes which receive the tuples of the producer nodes are called the consumer nodes. It is assumed that all producer and consumer nodes are directly connected.

When an RP operator is applied to a tuple stream containing correlated column references, data must flow both ways across connections. Correlated column values must first be sent from the consumer nodes to the producer nodes. The producer nodes then use the correlation values in their computations and send qualifying rows back to the consumer. This type of RP operator is called a listener RP. It is assumed that the node sending the correlation values, i.e. the node for which the producer is working on behalf of, is available on the producer side. The producer can use this node number to send rows back to the consumer. Alternatively, the consumer could supply its partitioning key columns and partitioning function to the producer. The producer could then apply the partitioning function to determine the node that will receive data. The latter approach is not generally as efficient since it might require the producer to send columns which were not even referenced as correlations by the producer. In accordance with the present invention, listener RP operations are minimized, since the synchronization involved reduces parallelism. When a listener is unavoidable, the data flow is minimized by essentially pushing predicates which would be applied on the consumer side of an RP operation onto the producer side of the operation.

Column Homogenization

The column homogenization algorithm is used to map columns of requirements (such as order, key, or partitioning requirements) that are written in terms of columns of one set of tables to equivalent columns of another set of tables \cite{Simmen96. It maps a column to an equivalent column, subject to the constraint that the equivalent column belongs to one of a set of target tables. It takes as input a column, a set of predicates, and the target tables. The set of predicates defines the equivalence classes which are in effect.

To illustrate the idea, suppose we have a partitioning column A.X that we want to homogenize to the set of tables {B, C} using predicate conjuncts A.X=B.X and A.X=C.X. The equivalence class for A.X contains A.X, B.X, and C.X. There are two columns in the equivalence class which belong to one of the target tables; therefore, B.X or C.X is returned arbitrarily. Changing the example slightly, suppose we have the same column and predicates but the target tables are {D, E}. In this case, there is no equivalent column which maps to the set of target tables so NULL is returned.

FIG. 5 is pseudo-code that illustrates the processing performed by the column homogenization process. The process searches the equivalence class and returns the first column belonging to the target tables. If no equivalent column satisfying the constraint exists, then NULL is returned. If there are multiple possibilities for mapping, or homogenizing, the column, then one is returned arbitrarily. Note that a column is equivalent to itself and thus can homogenize to itself if the table it belongs to is in the set of target tables.

A "Naive" Algorithm for Generating a Requirement for a Partitioned Join or Subquery Predicate Application A partitioned join or partitioned subquery predicate application requires that participating streams be equivalently partitioned. There can be multiple such partitionings. One approach at coming up with a target partitioning requirement for the operation is to cast the partitioning property of a QEP of one of the streams to a requirement. The stream providing this partitioning is called the target stream. Any QEP's whose partitioning property is broadcasting data are not permitted to provide the target partitioning. An equivalent partitioning requirement for the other stream is built, which is called the source stream, by homogenizing each of the partitioning key columns of the target partitioning requirement to columns of the source stream.

The build-dir-req process is illustrated in the pseudo-code of FIG. 6 for generating a requirement for a source stream from a target partitioning requirement.

The result partitioning is formed by using the nodegroup and partitioning function identifiers of the target partitioning requirement. The partitioning key of the result is formed by homogenizing each of the columns of the target partitioning key to a column of one of the source tables using the equivalence classes defined by the input predicates. If any column cannot be homogenized to a column of a source table, then the NULL partitioning requirement is returned, indicating that the join or subquery cannot be done in a partitioned fashion.

Using the build-dir-req Process to Build a Requirement for a Local or Directed Join Next, consider the use of the build-dir-req process for building a partitioning requirement for the source stream of a join. The build-join-req process represented in the pseudo-code of FIG. 7 illustrates the processing steps performed.

This process takes a QEP for one operand of a join, the tables requirement for the source stream (the other join operand), and the join predicates. The partitioning property of the target QEP provides the target partitioning requirement for the join. The build-join-req process returns the partitioning requirement which must be satisfied by a QEP of the source stream. If the target partitioning requirement can be mapped to the source stream via the build-dir-req process, then it will return that; otherwise, it will return a partitioning requirement which broadcasts to node of the target stream. Thus, the build-join-req process favors a local or directed join over a broadcast join. The requirement returned by build-dir-req will trigger a local join if there is a source QEP with an equivalent partitioning property and a directed join if an RP operator must be added to an existing QEP to satisfy the partitioning requirement.

Consider the following simple example of Query 6:

| Query 6 |
| --- |
| select * from A, B where A.x = B.x and A.y = B.y |

Suppose that A is partitioned over multiple nodes represented by the nodegroup identifier 100, function identifier 100, and partitioning key (A.x, A.y). The build-join-req process is called with a QEP for A, the source table B, and the join predicates A.x=B.x and A.y=B.y. The build-dir-req process is able to return a requirement for a local or directed join by mapping the partitioning key columns to the source table. The resulting source requirement has a nodegroup identifier of 100, a function identifier of 100, and a partitioning key of (B.x, B.y). If a QEP for B has an equivalent partitioning property, then the join can be done locally; otherwise, an RP operator is added to an existing QEP.

Note that it is not necessary to derive the target partitioning requirement from the partitioning property of an existing QEP. One could start with any partitioning requirement as a target and then attempt to map it to both operands of the join using the build-dir-req process. The build-join-req process shows just one application of the build-dir-req process. The build-join-req process assumes that the transitive closure of the set of predicates has been completed; however, conventional naive algorithms say nothing about including correlation predicates which span the source and target tables. They also mention nothing about join predicates which span preserved and null-producing sides of an outer join. Moreover, they do not take advantage of predicates which bind columns to constant values or nor do they handle correlation in a general way.

Using the build-dir-req Process to Build a Requirement for a Local or Directed Subquery Predicate Application The build-dir-req process is also used for building a requirement for a partitioned subquery predicate application. The build-subq-req process represented in FIG. 8 illustrates its use in building a requirement for a local or directed subquery predicate application.

As in the build-join-req process, the partitioning property of the target QEP provides the target partitioning requirement. The build-subq-req process returns the partitioning requirement which must be satisfied by a QEP of the source stream. If the target partitioning requirement can be mapped to the source stream via build-dir-req, then it will return that; otherwise, it will return a partitioning requirement which broadcasts to the target stream.

The primary difference between the build-subq-req process and the build-join-req process is in the set of predicates supplied to build-dir-req for homogenizing the partitioning key. In the case of the join, build-join-req uses only conjuncts applied by the join operand. When generating the subquery requirement, however, the build-subq-req process will use correlation predicates, and in certain cases, it can also use the subquery predicate (even when it is not a conjunct).

Consider the following example of Query 7:

---
Query 7
---
select *
from A
    where P or A.y = ANY (select B.z
        from B
        where B.x = A.x);
---

Suppose that A provides the target partitioning for a parallel subquery predicate evaluation and that it is again partitioned over multiple nodes represented by nodegroup identifier 100 and function identifier 100 applied to partitioning key (A.x, A.y).

The build-subq-req process is called with the correlation predicate B.x=A.x. It then adds the subquery predicate A.y=B.z and calls the build-dir-req process in an attempt to return a source partitioning requirement for a local or directed subquery predicate application. Using the correlation and subquery predicates, the build-dir-req process returns a source requirement with a nodegroup identifier of 100, a function identifier of 100, and a partitioning key (B.x, B.z). If a QEP for B has an equivalent partitioning property then the join can be done locally; otherwise, an RP operator is added to an existing QEP.

An Improved Process for Generating a Requirement for a Partitioned Join or Subquery Predicate Application When the build-dir-req process fails to determine that an equivalent partitioning requirement exists for the source stream, then either a broadcast join or broadcast subquery predicate application results. This is clearly less efficient than a local join or local subquery predicate application. It is also typically less efficient than one which directs tuples to the appropriate node.

The build-dir-req process described in the previous section maps a target partitioning to a source stream given a set of predicates for mapping between the target and source streams. The algorithm generally mimics what is in the open literature, and as was illustrated earlier, fails to consider the effect of predicates binding partitioning key columns. It also fails to handle correlation in a general way. The improved build-dir-req process shown in FIG. 9 remedies these shortcomings.

Like the naive algorithm, the improved build-dir-req process takes a target partitioning requirement, the tables of the source stream, and a set of predicates for mapping the partitioning key of the target partitioning requirement to columns of the source stream. The general idea is the same. The source partitioning is formed by using the nodegroup identifier and partitioning function identifier of the target partitioning. The partitioning key is formed by mapping the partitioning key column to the columns of the source stream.

There are two key differences between the naive and improved versions of the algorithm:

(1) A partitioning key column of the target partitioning requirement which is bound to a constant is considered mapped to the source stream by the constant; and (2) A partitioning key column of the target partitioning requirement which is referenced as a correlation by one of the source tables is considered mapped to the source stream by the correlation.

The effect of each of these changes will be illustrated by considering again the example of Query 4, described above:

---
Query 4
---
select *
from A, B
    where A.x = 3 and A.y = B.y
---

Suppose that Table A is partitioned over multiple nodes represented by nodegroup identifier 100, function identifier 100, and partitioning key (A.x, A.y). Using the build-join-req process that calls the earlier version of build-dir-req will result in the return of a source requirement that broadcasts to nodegroup 100. The reason is that the earlier version of build-dir-req fails to homogenize partitioning key column A.x, since there is no join predicate mapping it to a column of the source table B; consequently, the NULL partitioning requirement is returned.

The novel version of the build-dir-req process is able to generate a source partitioning requirement for a local or directed join. It is able to recognize that A.x is bound to the constant value 3 and maps it to the source stream using the constant. Using the join predicate to map the other partitioning key column, A.y, the source partitioning key for the join is (3, B.y). An RP operator which directs via partitioning key (3, B.y) can be added to an existing QEP for the source stream.

Consider next the change to the build-dir-req process that deals with correlation.

---
Query 8
---
select *
from A
    where P or A.y = ANY (select B.z)
        from B
        where B.x > A.x;
---

Suppose that Table A provides the target partitioning for a parallel subquery predicate evaluation and that it is again partitioned over multiple nodes represented by nodegroup identifier 100 and function identifier 100 applied to partitioning key (A.x, A.y).

Using the build-subq-req algorithm which calls the earlier version of build-dir-req will result in the return of a source requirement which broadcasts to nodegroup 100. Again, the reason is that the earlier version of build-dir-req fails to homogenize partitioning key column A.x since there is no join predicate mapping it to a column of the source table B; consequently, the NULL partitioning requirement is returned. The new version of build-subq-req is able to generate a source partitioning requirement for a local or directed subquery predicate application. It is able to recognize that A.x is referenced as a correlation and maps it to the source stream as is. Using the subquery predicate to map the other partitioning key column, A.y, the source partitioning key for the subquery is (A.x, B.z).

Thus, an RP operator which directs rows via partitioning key (A.x, B.z) can be added to an existing QEP producing the subquery result.

Changes to the Listener-RP Operator

Note that the RP operator added in the previous example would be a listener RP since the stream that the RP operator is applied to has a correlated column reference, A.x. Recall that a listener RP operator receives the correlation values from a consumer node, or caller, uses them in its computations, and sends qualifying tuples back to the caller. It was indicated that the caller's node number is available to the producer and that the RP operator simply uses it to determine where to send qualifying tuples as opposed to having the caller pass its partitioning key values. A change can be made to the behavior of the RP operator which will take advantage of the improvements to build-dir-req. The listener-rp-pred process represented in FIG. 10 illustrates these changes.

FIG. 10 describes a predicate which is applied to a tuple that the listener RP operator is getting ready to send back to the caller. If the RP operator has a target partitioning requirement with a partitioning key, it first applies the partitioning function to these column values. If the node-number is the same as that of the caller, then the tuple is sent back to the caller; otherwise, the tuple is not sent back. The effect of this change, in conjunction with the changes to build-dir-req, is to apply (either join or subquery) predicates which will be applied on the consumer side of an RP operator on the producer side.

Consider the previous example of Query 8 again.

| Query 8 |
| --- |
| select * from A where P or A.y = ANY (select B.z) from B where B.x > A.x; |

Using the improved build-dir-req process, a source requirement was determined for directing records from the stream producing the subquery result to the stream applying the subquery predicate. The partitioning key of this requirement is (A.x, B.z). Using the predicate described above, the listener RP operator could avoid sending many rows that would not satisfy the subquery predicate A.y=B.z.

To illustrate this further, assume that a tuple on some node N of A has the values 1 for x and 1 for y and a tuple on a different node of B has the values 10 for x and 2 for z. Note that the B tuple satisfies the subquery predicate B.x>A.x. Therefore, if the listener RP operator did not apply the predicate described by listener-rp-pred, it would send the record back to node N. However, this tuple will not satisfy the subquery predicate A.y=B.z. Applying listener-rp-pred to the tuple would reduce the likelihood of this happening. It would apply the partitioning function to partitioning key values A.x=1 and B.z=2 and compare the result to the caller's node. Assuming that tuples of table A having x=1 and y=2 and that tuples having x=1 and y=1 are assigned to different nodes, this predicate would then avoid sending a tuple which could not satisfy the subquery predicate. It is possible that another tuple on node N of Table A has and x=1 and y=2. This is why the subquery predicate is still applied on the consumer side. This change offers some early filtering in cases where this is not true. Note that if all of the columns in the result of build-dir-req are correlated, then the RP operator can avoid applying the listener-rp-pred process, since it will do no filtering. This explains why build-dir-req returns the NULL partition requirement when none of the partitioning key columns of the target map to source columns.

Using the Improved build-dir-req Process to Build a Requirement for a Local or Directed Join Some changes are implemented to the conventional build-join-req process. First of all, it will call the improved version of build-dir-req which exploits the binding of partitioning key columns to constants and their references as correlations. Consequently, in addition to join predicates, the process will be called with local predicates and predicates referenced in the source stream which are correlated to the target stream. Outer join predicates are permitted as well.

Using the Improved build-dir-req Process to Build a Requirement for a Local or Directed Subquery Predicate Application A new version of the build-subq-req process is not implemented, but changes to the conventional process will use the improved version of build-dir-req and that it will also supply local predicates as well as predicates referenced in the source stream which are correlated to the target stream. We also note a change with regard to which subquery predicates can supply a predicate to build-dir-req. A subquery predicate of the form column 1<>ALL column 2 is allowed to contribute to the mapping predicates and is passed to build-dir-req. This is semantically incorrect if one of the columns where to have a null value. It is noted that build-subq-req should exclude this predicate unless both columns are not nullable.

A Naive Algorithm for Determining If Aggregation Can be Completed Locally

It was noted that the parallel execution strategy for aggregation begins by aggregating on each partition of the input stream. Then, if necessary, data is repartitioned so that tuples in the same group land on the same node and a final aggregation step takes place. It was noted that the final aggregation step can be avoided if data is initially partitioned so that tuples in the same group are on same node. This is the case when the partitioning key columns of the input stream are a subset of the grouping columns.

The local-agg-test process shown in FIG. 11 is the currently known test for determining when aggregation can be completed locally.

The process tests the partitioning property of the input QEP against the grouping columns and returns true if either (a) the QEP is on a single node; or (b) the QEP's partitioning key is a subset of the grouping columns. The process returns false otherwise.

Note that the process takes column equivalence classes into account as shown in the following example of Query 9.

| Query 9 |
| --- |
| select count(*) <br> from A <br> where x = z <br> group by z,y |

Suppose that Table A is partitioned over multiple nodes using the partitioning key (x). After substituting the grouping column, x, with the equivalent column, z, it is clear that the partitioning key columns are a subset of the grouping columns. The effect of column equivalence classes is taken into account on line 11 where it considers a partitioning key column a member of the grouping columns if it is in the same equivalence class as a grouping column. The algorithm does not, however, take into account the effect of predicates which bind partitioning key columns to constant or correlated values. Failure to take these effects into account could result in unnecessary repartitioning of data.

An Improved Process for Determining If Aggregation Can be Completed Locally

The improved version of the local-agg-test process is shown in FIG. 12.

The improved version makes a simple yet powerful change to the previous version of the algorithm. It assumes that any partitioning key column which is bound to a constant or correlation value is vacuously a member of the grouping columns. In effect, we now say that aggregation can be completed locally if the unbound partitioning key columns are a subset of the grouping columns.

Consider the example of Query 10, where this change prevents repartitioning.

| Query 10 |
| --- |
| select count(*) <br> from A <br> where x = 3 <br> group by y |

Suppose that Table A is partitioned over multiple nodes using partitioning key (x, y). It should be noted that the partitioning key columns (x, y) are not a subset of the grouping columns (y). Aggregation can be completed locally, however, since partitioning key column, x, is bound to a constant value. The proof is best given by contradiction. The argument is similar to that given above, for the example that made use of constants to facilitate a directed join operation.

Finally, note that if all of the partitioning key columns are bound to a constant or correlation value, then the algorithm returns true regardless of what the grouping columns are. In fact, it will return true in this case if there are no grouping columns as illustrated by the following example of Query 11.

| Query 11 |
| --- |
| select * <br> from B <br> where B.z = (select count(*) <br> from A <br> where x = B.x and y = 3) |

Again, suppose that A is partitioned over multiple nodes using partitioning key (x, y). Note that x is bound to a correlation value and y is bound to a constant. Thus, each is vacuously assumed to be contained in the set of grouping columns, even though there are none. Note that these bindings effectively limit each execution of the subquery to a single node.

Advantages of the Invention

This disclosure described novel techniques used in performing partition analysis during query optimization for joins, subquery predicate application, and aggregation. One of the main goals of partition analysis is to optimize or avoid data repartitioning by recognizing the possible partitioning requirements for achieving parallelism for a query operation and when the partitioning property of the data satisfies the partitioning requirements of a query operation. Unlike known techniques, the techniques presented here consider the effect of predicates during partition analysis.

An algorithm called build-dir-req was presented above for generating a partitioning requirement for a partitioned join or partition subquery predicate application. Its use in determining a requirement for a local or directed join was shown by the description of the build-join-req process. Also illustrated was its use in determining a requirement for a local or directed subquery predicate application via the build-subq-req algorithm.

The build-dir-req process is an improvement over the current state of the art in that it takes into account predicates that bind partitioning key columns to constant values. It also handles partitioning key columns which are referenced as correlations in a general way. The latter changes sometimes make it possible to filter tuples on the producer side of a listener RP operation which would not satisfy predicates which will be applied on the consumer side. A listener-rp-pred process that takes advantage of this was described.

Finally, a process called local-agg-test was described for determining when aggregation can be completed locally. Unlike known techniques, this process takes into account predicates which bind partitioning key columns to constant or correlated values.

The present invention has been described above in terms of a presently preferred embodiment so that an understanding of the present invention can be conveyed. There are, however, many configurations for SQL-processing relational data base management systems not specifically described herein but with which the present invention is applicable. The present invention should therefore not be seen as limited to the particular embodiments described herein, but rather, it should be understood that the present invention has wide applicability with respect to SQL-processing relational data base management systems generally. All modifications, variations, or equivalent arrangements and implementations that are within the scope of the attached claims should therefore be considered within the scope of the invention.

What is claimed is:

1. A method of processing a query in a relational database management system that operates in a computer network to retrieve data from tables in computer storage, the method comprising the steps of:

receiving two partitioned data streams that relate to a join operation;

determining whether conjunct predicates can be used to locally perform a parallel inner join or outer join; and performing the join operation locally if the step of determining indicates appropriate conjunct predicates can be used.

2. A method as defined in claim 1, wherein the step of determining comprises applying conjunct predicates that equate columns of the same table.

3. A method as defined in claim 1, wherein the step of determining comprises applying conjunct predicates that equate two columns, where one column is bound.

4. A method as defined in claim 1, wherein the step of determining comprises applying conjunct predicates that equate columns of two different tables.

5. A method as defined in claim 4, wherein neither one of the columns referenced by the column-equating predicates comprises a correlated column reference.

6. A method as defined in claim 4, wherein one of the columns referenced by the column-equating predicates comprises a correlated column reference.

7. A method as defined in claim 1, wherein the partitioned data streams comprise a source data stream and a target data stream, and the method further comprises the steps of:

receiving a target query evaluation plan (QEP) that produces tuples of the target data stream, which are to be joined with the source data stream;

receiving a source tables requirement for the tables of the source data stream to be joined;

receiving a set of source QEPs that produce tuples of the source data stream;

receiving a set of conjunct predicates determined to be suitable for locally performing a parallel inner join or outer join;

generating a source partitioning requirement from a partitioning property of the target QEP, the source tables requirement, and the set of conjunct predicates; and indicating that a local join is possible if there is a source QEP with a partitioning property that is equivalent to the source partitioning requirement.

8. A method as defined in claim 7, wherein source partitioning requirements generated by the step of determining are generated by performing a build-dir-req process, wherein the build-dir-req process comprises the steps of:

setting a node group identifier of the source partitioning requirement to a node group identifier of the partitioning property of the target QEP;

setting a partitioning function identifier of the source partitioning requirement to that of a partitioning function identifier of the partitioning property of the target QEP;

forming the partitioning key of the source partitioning requirement by mapping partitioning key columns of the partitioning property of the target QEP to a column of the source data stream, wherein:

a column of the partitioning key of the target QEP that is bound to a constant value C in the target data stream is mapped to the source data stream as C;

a column of the partitioning key of the target QEP that is bound to a correlated value C in the target data stream is mapped to the source data stream as C; and a column of the partitioning key of the target QEP that is in an equivalence class the same as a column C of the source data stream is mapped as C.

9. A method of processing a query in a relational database management system that operates in a computer network to retrieve data from tables in computer storage, the method comprising the steps of:

receiving two partitioned data streams that comprise a source data stream and a target data stream, wherein the data streams relate to a join operation;

determining whether conjunct predicates can be used to direct tuples of the source data stream to the target data stream; and performing the join operation after directing the tuples of the source data stream to the target data stream if the step of determining indicates appropriate conjunct predicates can be used.

10. A method as defined in claim 9, wherein the step of determining comprises applying conjunct predicates that equate columns of the same table.

11. A method as defined in claim 9, wherein the step of determining comprises applying conjunct predicates that equate two columns, where one column is bound.

12. A method as defined in claim 9, wherein the step of determining comprises applying conjunct predicates that equate columns of two different tables.

13. A method as defined in claim 12, wherein neither one of the columns referenced by the column-equating predicates comprises a correlated column reference.

14. A method as defined in claim 12, wherein one of the columns referenced by the column-equating predicates comprises a correlated column reference.

15. A method as defined in claim 9, wherein the method further comprises the steps of:

receiving a target query evaluation plan (QEP) that produces tuples of the target data stream, which are to be joined with the source data stream;

receiving a source tables requirement for the tables of the source data stream to be joined;

receiving a set of conjunct predicates determined to be suitable for determining if the join can be done by directing tuples from nodes of the source data stream to nodes of the target data stream;

generating a source partitioning requirement from a partitioning property of the target QEP, the source tables requirement, and the set of conjunct predicates; and indicating that the join operation can be performed by directing tuples from nodes of the source data stream to nodes of the target data stream, if a source partitioning is generated, by returning the source partitioning requirement, otherwise indicating that the join operation cannot be directed, by returning a broadcast partitioning requirement.

16. A method as defined in claim 15, wherein source partitioning requirements generated by the step of determining are generated by performing a build-dir-req process, wherein the build-dir-req process comprises the steps of:

setting a node group identifier of the source partitioning requirement to a node group identifier of the partitioning property of the target QEP;

setting a partitioning function identifier of the source partitioning requirement to that of a partitioning function identifier of the partitioning property of the target QEP;

forming the partitioning key of the source partitioning requirement by mapping partitioning key columns of the partitioning property of the target QEP to a column of the source data stream, wherein:

a column of the partitioning key of the target QEP that is bound to a constant value C in the target data stream is mapped to the source data stream as C;

a column of the partitioning key of the target QEP that is bound to a correlated value C in the target data stream is mapped to the source data stream as C; and a column of the partitioning key of the target QEP that is in an equivalence class the same as a column C of the source data stream is mapped as C.

17. A method of processing a query in a relational database management system that operates in a computer network to retrieve data from tables in computer storage, the method comprising the steps of:

receiving two data streams that comprise a source data stream and a target data stream, wherein a subquery predicate will be applied to the data streams;

determining whether the subquery predicate can be applied to the target data stream locally in parallel; and applying the determined subquery predicate in parallel, locally, if the step of determining indicates the subquery predicate can be so applied.

18. A method as defined in claim 17, wherein the step of determining comprises applying conjunct predicates that equate columns of the same table.

19. A method as defined in claim 17, wherein the step of determining comprises applying conjunct predicates that equate two columns, where one column is bound.

20. A method as defined in claim 17, wherein the step of determining comprises applying conjunct predicates that equate columns of two different tables.

21. A method as defined in claim 18, wherein neither one of the columns referenced by the column-equating predicates comprises a correlated column reference.

22. A method as defined in claim 18, wherein one of the columns referenced by the column-equating predicates comprises a correlated column reference.

23. A method as defined in claim 15, wherein the step of determining comprises applying a subquery predicate that equates a column of a table in the target data stream with a column in the source data stream, and a subquery operator is either an ANY operator or an IN operator.

24. A method as defined in claim 15, wherein the step of determining comprises applying a subquery predicate that equates a non-nullable column of a table in the target data stream with a non-nullable column in the source data stream, and a subquery operator is either a NOT ALL operator or a NOT IN operator.

25. A method as defined in claim 15, wherein the partitioned data streams comprise a source data stream and a target data stream, and the method further comprises the steps of:

receiving a target query evaluation plan (QEP) that produces tuples of the target data stream, which are to be compared with tuples of the source data stream by a subquery predicate;

receiving a source tables requirement for the tables of the data stream producing the subquery tuples;

receiving a set of conjunct predicates determined to be suitable for deciding whether the subquery predicate can be applied to the target data stream locally, in parallel;

generating a source partitioning requirement from a partitioning property of the target QEP, the source tables requirement, and the set of conjunct predicates; and indicating that a local join is possible if there is a source QEP with a partitioning property that is equivalent to the source partitioning requirement.

26. A method as defined in claim 25, wherein source partitioning requirements generated by the step of determining are generated by performing a build-dir-req process, wherein the build-dir-req process comprises the steps of:

setting a node group identifier of the source partitioning requirement to a node group identifier of the partitioning property of the target QEP;

setting a partitioning function identifier of the source partitioning requirement to that of a partitioning function identifier of the partitioning property of the target QEP;

forming the partitioning key of the source partitioning requirement by mapping partitioning key columns of the partitioning property of the target QEP to a column of the source data stream, wherein:

a column of the partitioning key of the target QEP that is bound to a constant value C in the target data stream is mapped to the source data stream as C;

a column of the partitioning key of the target QEP that is bound to a correlated value C in the target data stream is mapped to the source data stream as C; and a column of the partitioning key of the target QEP that is in an equivalence class the same as a column C of the source data stream is mapped as C.

27. A method of processing a query in a relational database management system that operates in a computer network to retrieve data from tables in computer storage, the method comprising the steps of:

receiving two partitioned data streams that comprise a source data stream and a target data stream, wherein a subquery predicate will be applied to the data streams;

determining whether the subquery predicate and a conjunct predicate can be used to direct tuples of the source data stream to the target data stream; and directing the tuples of the source data stream to the target data stream if the step of determining indicates appropriate predicates can be so used.

28. A method as defined in claim 27, wherein the conjunct predicate in the step of determining comprises a conjunct predicate that equates columns of the same table.

29. A method as defined in claim 27, wherein the conjunct predicate in the step of determining comprises a conjunct predicate that equates two columns, where one column is bound.

30. A method as defined in claim 27, wherein the conjunct predicate in the step of determining comprises a conjunct predicate that equates columns of two different tables.

31. A method as defined in claim 30, wherein neither one of the columns referenced by the column-equating predicates comprises a correlated column reference.

32. A method as defined in claim 30, wherein one of the columns referenced by the column-equating predicates comprises a correlated column reference.

33. A method as defined in claim 27, wherein the step of determining comprises applying a subquery predicate that equates a column of a table in the target data stream with a column in the source data stream, and a subquery operator is either an ANY operator or an IN operator.

34. A method as defined in claim 27, wherein the step of determining comprises applying a subquery predicate that equates a non-nullable column of a table in the target data stream with a non-nullable column in the source data stream, and a subquery operator is either a NOT ALL operator or a NOT IN operator.

35. A method as defined in claim 27, wherein the method further comprises the steps of:
receiving a target query evaluation plan (QEP) that produces tuples of the target data stream, which are to be compared with tuples of the source data stream by a subquery predicate;
receiving a source tables requirement for the tables of the data stream producing the subquery tuples;
receiving a set of conjunct predicates determined to be suitable for deciding whether the subquery predicate can be applied to the target data stream by directing tuples from nodes of the source data stream to nodes of the target data stream;
generating a source partitioning requirement from a partitioning property of the target QEP, the source tables requirement, and the set of conjunct predicates; and
indicating that a local join is possible if there is a source QEP with a partitioning property that is equivalent to the source partitioning requirement, and otherwise indicating that the join operation cannot be directed and returning a broadcast partitioning requirement.

36. A method as defined in claim 35, wherein source partitioning requirements generated by the step of determining are generated by performing a build-dir-req process, wherein the build-dir-req process comprises the steps of:
setting a node group identifier of the source partitioning requirement to a node group identifier of the partitioning property of the target QEP;
setting a partitioning function identifier of the source partitioning requirement to that of a partitioning function identifier of the partitioning property of the target QEP;
forming the partitioning key of the source partitioning requirement by mapping partitioning key columns of the partitioning property of the target QEP to a column of the source data stream, wherein:
a column of the partitioning key of the target QEP that is bound to a constant value C in the target data stream is mapped to the source data stream as C;
a column of the partitioning key of the target QEP that is bound to a correlated value C in the target data stream is mapped to the source data stream as C; and
a column of the partitioning key of the target QEP that is in an equivalence class the same as a column C of the source data stream is mapped as C.

37. A method of processing a query in a relational database management system that operates in a computer network to retrieve data from tables in computer storage, the method comprising the steps of:
receiving a query that includes a relational operator that specifies one or more columns of tables in the computer storage that are distributed with a source partitioning across nodes of the computer network that are to be compared with one or more rows of tables in the computer storage that are distributed with a target partitioning across nodes of the computer network;
receiving a target partitioning requirement, tables of the source stream of data, and a set of predicates for mapping a partitioning key of the target partitioning requirement to columns of the source stream;
performing a repartitioning correlated RP operator of the system in response to a request from a consumer node to deliver a repartitioned table to a target node, wherein the RP operator comprises the steps of:
applying the source partitioning as a predicate operation to a tuple that the RP operator is to send back to the consumer node;
applying a partitioning function to column values if the RP operator is specified with the target partitioning requirement;
sending the tuple back to the consumer node if the target node of the RP operator is the same as that of the consumer node; and otherwise not sending the tuple back to the consumer node.

38. A method of processing a query in a relational database management system that operates in a computer network to retrieve data from tables in computer storage, the method comprising the steps of:
receiving a partitioned data stream to which a table operation comprising either an aggregation operation or a distinct operation will be applied;
determining whether conjunct predicates can be used to locally perform the table operation in parallel; and
performing the parallel table operation locally if the step of determining indicates appropriate conjunct predicates can be used.

39. A method as defined in claim 38, wherein the step of determining comprises applying conjunct predicates that equate columns of the same table.

40. A method as defined in claim 38, wherein the step of determining comprises applying conjunct predicates that equate two columns, where one column is bound.

41. A method as defined in claim 38, wherein the step of determining comprises applying conjunct predicates that equate columns of two different tables.

42. A method as defined in claim 41, wherein neither one of the columns referenced by the column-equating predicates comprises a correlated column reference.

43. A method as defined in claim 41, wherein one of the columns referenced by the column-equating predicates comprises a correlated column reference.

44. A method as defined in claim 38, further including the step of indicating that an aggregation operation can be performed locally, in parallel, if upon substituting columns of a key of the partitioning operation and columns of a key of the aggregating operation or of a key of the distinct operation with equivalence class heads, it is determined that unbound partitioning key columns are a subset of the aggregating or distinct key columns.

* * * * *